United States Patent
Sugiyama

[11] Patent Number: 6,082,699
[45] Date of Patent: Jul. 4, 2000

[54] RESIN MOLDING BRACKET

[75] Inventor: Norio Sugiyama, Shizuoka, Japan

[73] Assignee: Yazaki Corporation, Tokyo, Japan

[21] Appl. No.: 09/081,078

[22] Filed: May 19, 1998

[30] Foreign Application Priority Data

May 21, 1997 [JP] Japan ................................ 9-130901

[51] Int. Cl.[7] .................................................. A47G 29/00
[52] U.S. Cl. ........................................................ 248/694
[58] Field of Search ................................ 264/271.1, 275; 248/694

[56] References Cited

U.S. PATENT DOCUMENTS

| | | | |
|---|---|---|---|
| 4,335,417 | 6/1982 | Sakashaug et al. | 361/127 |
| 4,659,268 | 4/1987 | Del Mundo et al. | 411/82 |
| 5,675,248 | 10/1997 | Kurita et al. | 324/174 |
| 5,871,681 | 2/1999 | Karino et al. | 264/272.15 |

*Primary Examiner*—Ramon O. Ramirez
*Assistant Examiner*—David Heisey
*Attorney, Agent, or Firm*—Morgan, Lewis & Bockius LLP

[57] ABSTRACT

A resin molding bracket, according to the invention, comprises: a plate-shaped bracket body 10 which is made integral with a resin molding 2 when molded; and a collar 20 into which a bolt is inserted to fixedly secure the bracket body 10, the collar having recesses 20a in the cylindrical surface thereof which are to fixedly position the collar in the bracket body, and having both end portions 20b and 20c protruded respectively from both surfaces of the bracket body 10.

5 Claims, 7 Drawing Sheets

FIG.7 PRIOR ART
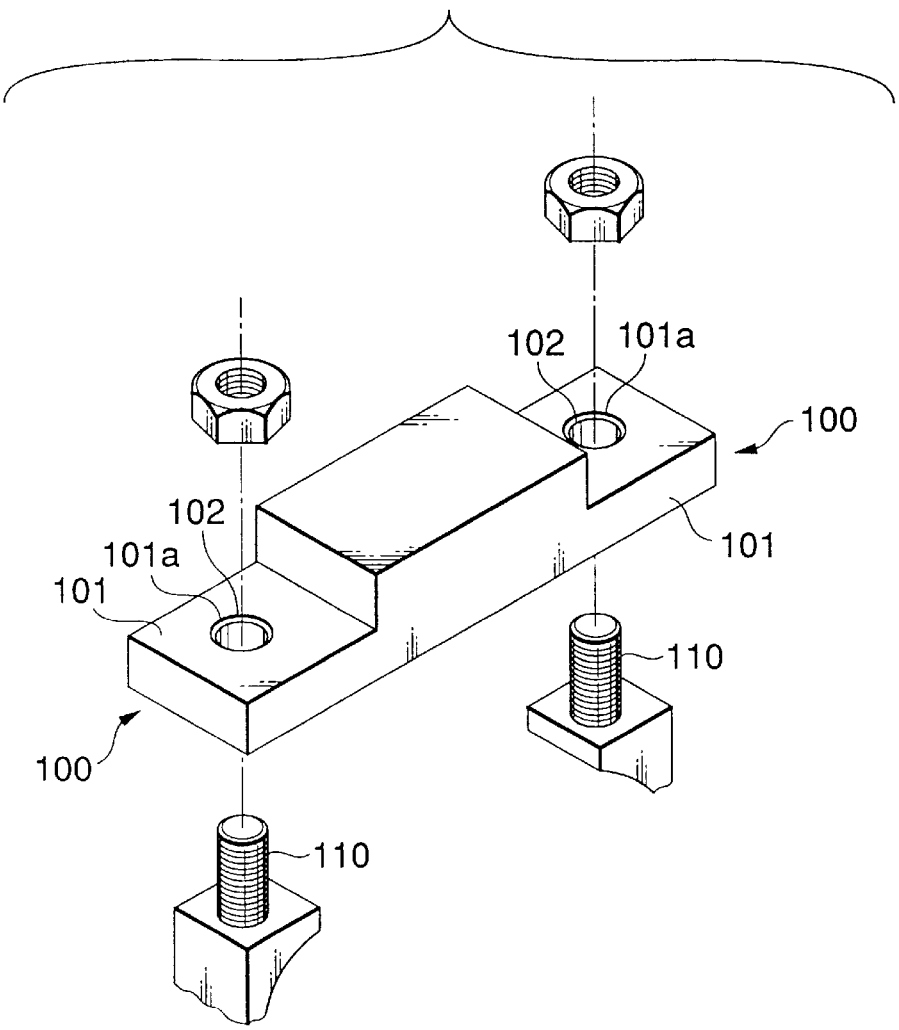
PRIOR ART
FIG.8(a)
PRIOR ART
FIG.8(b)
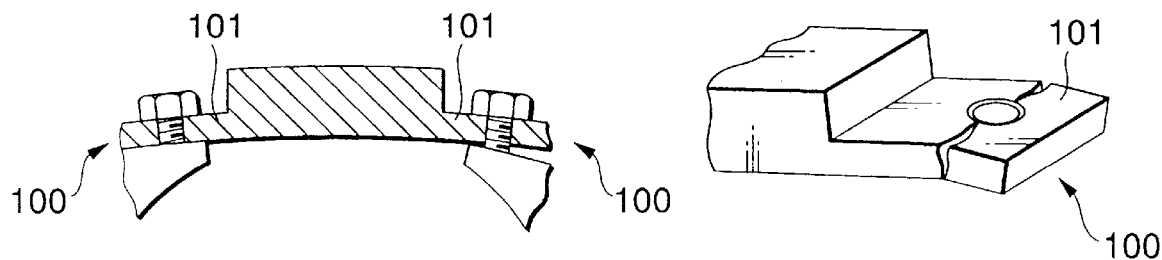

RESIN MOLDING BRACKET

BACKGROUND OF THE INVENTION

1. Field of the Invention

This invention relates to a bracket used to fix a resin molding, and more particularly to a bracket of a resin molding (hereinafter referred to as "a resin molding bracket", when applicable) which is simple in structure, and which is positively prevented from being broken even when it is bent or tightened excessively hard with a bolt, and which is improved in water-proof characteristic.

2. Related Art

FIG. 7 is a perspective view of a conventional general resin molding bracket.

As shown in FIG. 7, the bracket 100 is designed as follows: A plate-shaped bracket body 101 integral with a resin molding has through-holes 101a, and cylindrical collars 102 are fixedly inserted into the through-holes 101a. Bolts 110 are inserted into the collars 102, to fixedly secure the resin molding to a member to which the resin molding to be mounted (hereinafter referred to as "an aimed member", when applicable).

The above-described bracket 100 suffers from the following problems: When, as shown in the parts (a) and (b) of FIG. 8, an external force is applied to the aimed member, or the bracket 100 is mounted on the sloped surface or curved surface, the bracket body 101 is bent, so that the bracket body 101 is broken by stress.

In order to solve the above-described problems, Japanese Utility Patent Application (OPI) No. 47509/1993 (the term "OPI" as used herein means an "unexamined published application") has disclosed a bracket 201b as shown in FIG. 9. That is, its bracket body 201 has slits 201 which are extended from the ends of the bracket body 201 to through-holes 201a.

The bracket 200 is advantageous in the following point: That is, even when an external force is applied to the aimed member, the slits 201b are spread to release the stress applied thereto. This feature prevents the bracket body 201 from being broken.

In addition, in order to solve the above-described problems, Japanese Utility Patent Application (OPI) No. 50117/1993 has disclosed a bracket 300 as shown in FIG. 10. That is, an annular recess 301b is formed around each of the through-holes 301a formed in the bracket body 301 from being broken.

The bracket 300 is advantageous in the following point: Even when the bracket is mounted on a sloped surface or curved surface, the annular recess 301b is bent to absorb the stress, which prevents the bracket body 301.

However, the bracket 300 is disadvantageous in the following point: That is, in the case where the nut 310 is tightened excessively hard, a great stress is applied directly to the bracket body 301, so that the latter 301 may be cracked.

On the other hand, in the case of the above-described bracket 200 having the collars 202 with the flanges, the difficulty is eliminated that the bracket body is broken being tightened excessively hard with the bolt. However, the manufacture of the collar with the flange needs drawing or cutting work, thus being high in cost.

SUMMARY OF THE INVENTION

In view of the foregoing, an object of the invention is to provide a resin molding bracket which is simple in structure, and which is positively prevented from being broken even when it is bent or tightened excessively hard with a bolt, and which is high in water-proof characteristic.

The foregoing object of the invention has been achieved by the provision of a resin molding bracket which comprises:

a plate-shaped bracket body which is made integral with a resin molding when molded; and a collar into which a bolt is inserted to fixedly secure the bracket body, the collar having recesses and/or protrusions which are to fixedly position the collar in the bracket body, and having both end portions protruded respectively from both surfaces of the bracket body.

In the bracket, both end portions of the collar are protruded from both surfaces of the bracket body. Therefore, even when the bolt is tightened excessively hard, the stress is applied only to the protrusions of the collar.

Accordingly, even when the bolt is tightened excessively hard, no stress is applied to the bracket body; that is, the latter is positively prevented from being cracked.

The lengths of protrusion of the protrusions are determined from the flatness of both surfaces of the bracket body, so that the protrusions are sufficiently protruded from both surfaces of the bracket body.

The lengths of protrusion of the protrusions are determined according to the length of the collar and the positioning of the collar with respect to the bracket body.

In the resin molding bracket, according to the invention the bracket body includes annular grooves which surround the outer cylindrical surfaces of the protrusions of the collar.

After the collar is fixed in the bracket body of resin, the bracket body is contracted. When the bracket body is contracted in this manner, the resin around the collar protrusions may rise (swell). The rise obstructs the close contact of the bracket body with the aimed member, and lowers the water-proof characteristic with the joint surface of the bracket body and the aimed member as a seal surface.

However, with the above-described bracket, the annular grooves formed around the protrusions of the collar minimizes the amount of rise of the resin around the collar protrusions, and improves the water-proof characteristic with the joint surface of the bracket body and the aimed member as a seal surface.

In the case where the bracket is formed by insert-molding as disclosed by claim 4, the molded resin is considerably contracted. Therefore, the bracket of the present invention is effective in reducing the contraction.

In the resin molding bracket of the present invention, the wall thickness of the bracket body is large, whereby the bracket body is high in mechanical strength.

In the bracket, the wall thickness of the bracket body is made large, so that, even when bent, the latter is high in durability against the mechanical stress. That is, the bracket body is prevented from being cracked when bent.

In the feature of the present invention, the damage of the bracket body can be prevented. More specifically, the bracket body can be prevented from being cracked when the former is tightened excessively hard with the bolt or when bent.

In the resin molding bracket of the present invention, the collar is made integral with the bracket body by insert-molding.

With the bracket, simultaneously when the bracket body is molded, the collar is fixedly positioned in the bracket body. With the aid of the recesses or protrusion of the collar, the collar is positively fixed in the bracket body.

The bracket may be assembled as follows: A through-hole having protrusions or recesses corresponding to the recesses or protrusions of the collar is formed in the bracket body. After the bracket body is molded, the collar is inserted into the through-hole.

In this case, the through-hole must be formed in the bracket body. The formation of the bracket needs two manufacturing steps a step of forming the bracket body, and a step of inserting the collar into the bracket body.

On the other hand, when the bracket of the present invention is formed by insert-molding, the difficulty is eliminated that it is necessary to form the through-hole in the bracket body. And the bracket can be formed in one manufacturing step.

BRIEF DESCRIPTION OF THE DRAWINGS

FIG. 7 is an exploded perspective view showing a conventional general resin molding bracket;

FIG. 8(a) is a sectional view showing a conventional bracket which is bent and FIG. 8(b) is a perspective view showing the conventional bracket which has been cracked.

DETAILED DESCRIPTION OF THE PREFERRED EMBODIMENTS

Preferred embodiments of the invention will be described with reference to the accompanying drawings.
First Embodiment An example of a resin molding bracket, which constitutes a first embodiment of the invention, will be described with reference to FIGS. 1 and 2.

Figure 1:
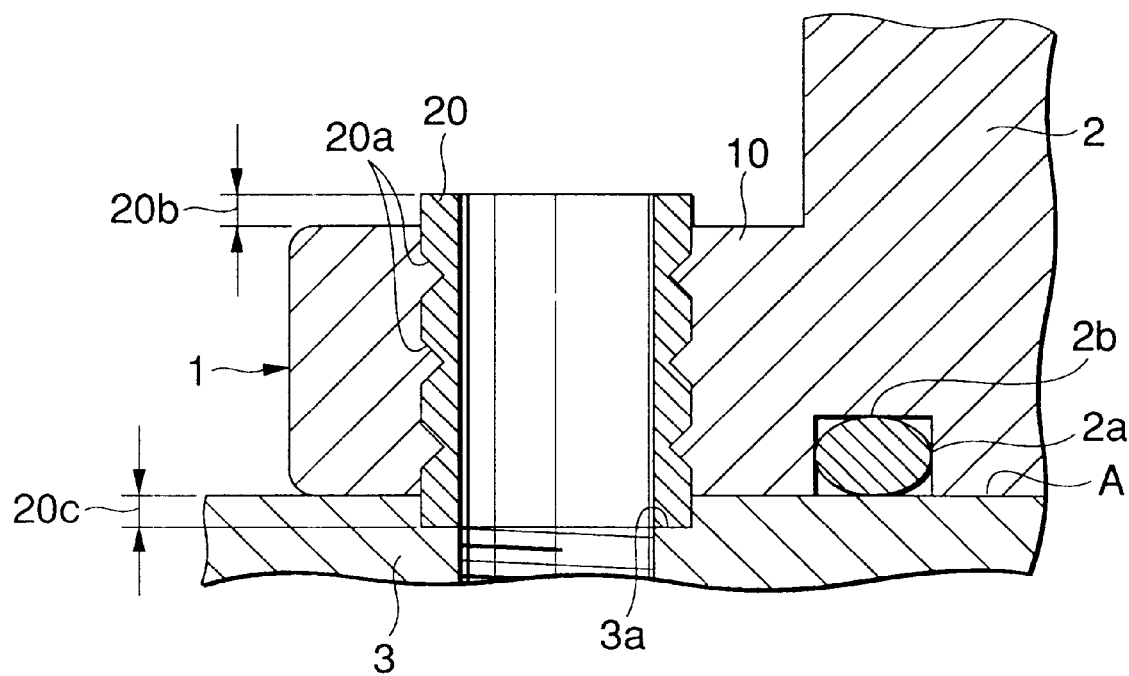
FIG. 1 is a sectional view showing an example of a resin molding bracket, which constitutes a first embodiment of the invention.
Figure 2A:
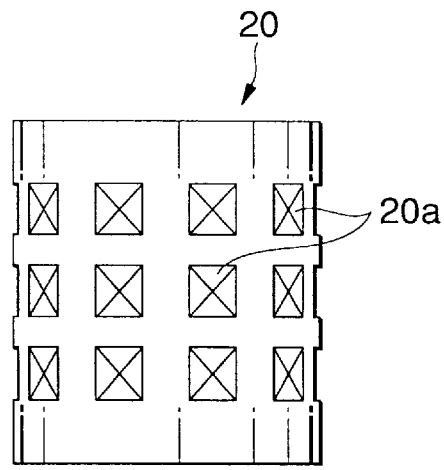
FIG. 2(a) is a front view of a collar forming the bracket.
Figure 2B:
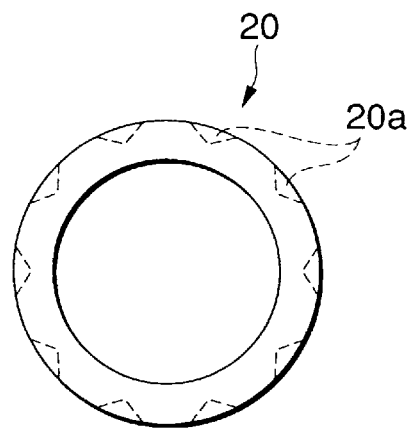
FIG. 2(b) is a plan view of the collar.
Figure 2C:
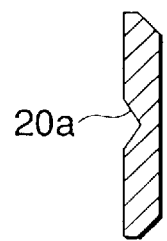
FIG. 2(c) is a sectional view of a part of the side wall of the collar.
Figure 3:
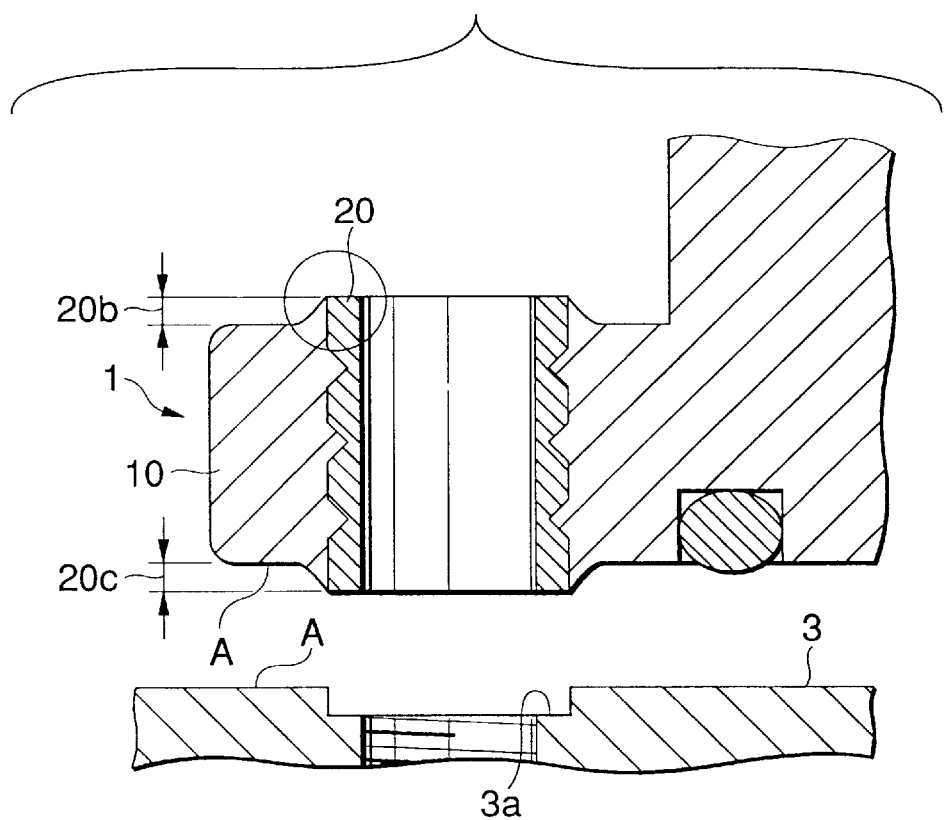
FIG. 3 is a sectional view of the bracket, the first embodiment of the invention.

FIG. 1 is a sectional view showing an example of a resin molding bracket, the first embodiment of the invention. FIG. 2 shows a collar forming the bracket. More specifically, the part (a) of FIG. 2 is a front view of the collar, and the part (b) of FIG. 2 is a plan view of the collar, and the part (c) of FIG. 3 is a sectional of a part of the side wall of the collar.

In FIG. 1, reference numeral 1 designates the bracket. The bracket 1 comprises a plate-shaped bracket body 10 which is integral with a resin molding 2; and a cylindrical collar which is fixedly set in the bracket body 10 by insert-molding.

The bracket body 10 is secured to an aimed member 3 with bolts (not shown).

The wall thickness of the bracket body 10 is large, and therefore the bracket body 10 is high in mechanical strength.

In other words, the bracket body 10 is increased in durability with respect to the mechanical stress which may be applied thereto when the bracket body 10 is bent, and the bracket body 10 is prevented from being cracked when bent.

In the embodiment, the resin molding 2 and the aimed member 3 are elements such as a cover body or casing body accommodating a machine (not shown) which is protected from being wet.

Accordingly, the joint surface A of the bracket body 10 and the aimed member 3 is a seal surface. In order to make the machine water-proof, an annular groove 2a is formed in the rear surface of the resin molding 2, and a packing 2b is fitted in the annular groove 2a. The aimed member 3 has a step (recess) 3a in the surface which corresponds to the protrusion 20c of a collar 20.

The collar 20 is a metal cylindrical member into which the aforementioned bolt is inserted to secure the bracket body 10 to the aimed member. As shown in the parts (a) through (b) of FIG. 2, a plurality of pyramid-shaped recesses 20a are formed in the whole surfaces of the collar 20.

The length of the collar 20 is larger than the wall thickness of the bracket body 10. More specifically, when the collar 20 is inserted into the bracket body 10, both end portions of the collar 20 are protruded from the bracket body 10, thus forming the protrusions 20b and 20c.

Referring back to FIG. 1, the lengths of protrusion of the protrusions 20b and 20c are determined from the flatness of both surfaces of the bracket body 10, so that the protrusions 20b and 20c are sufficiently protruded from both surfaces of the bracket body 10.

The lengths of protrusion of the protrusions 20b and 20c are determined according to the length of the collar 20 and the positioning of the collar with respect to the bracket body 10.

When the collar 20 is fixed in the bracket body 10 by inserting molding, resin forming the bracket body 10 flows in the recesses 20a formed in the cylindrical surface of the collar 20. Hence, after the resin is cooled down, the collar 20 is fixedly positioned in the bracket body 10.

In the above-described bracket 1, the protrusions 20b and 20c are protruded from the bracket body 10 as was described above. Therefore, even when the bolt is tightened excessively hard, the resultant stress is applied to the protrusions 20b and 20c only.

Hence, even if the bolt is tightened excessively hard, no stress is applied to the bracket body 10; that is, the latter 10 is positively prevented from being cracked.

In the embodiment, the wall thickness of the bracket body 10 is made large, so that, even when bent, the latter is high in durability against the mechanical stress. That is, the bracket body is prevented from being cracked when bent.

The collar 20 is made integral with the bracket body 10 by insert-molding. Hence, simultaneously when the bracket body 10 is formed, the collar can be positioned in the bracket body 10. In addition, owing to the recesses 20a, the collar 20 is positively fixedly positioned in the bracket body 10.

The aforementioned bracket 1 may be assembled as follows: A through-hole having protrusions corresponding to the recesses 20a is formed in the bracket body 10. After the formation of the bracket body 10, the collar 20 is inserted into the aforementioned through-hole.

However, in this modification, it is necessary to form the through-hole having the protrusions in the bracket body 10. In addition, the formation of the bracket 1 needs two manufacturing steps; a step of forming of the bracket body 10 and a step of inserting of the collar 20.

On the other hand, in the case where the insert-molding method is employed, it is unnecessary to form the through-hole having the protrusions in the bracket body 10. In addition, the bracket 1 can be formed in one manufacturing step.

Second Embodiment

Figure 4:
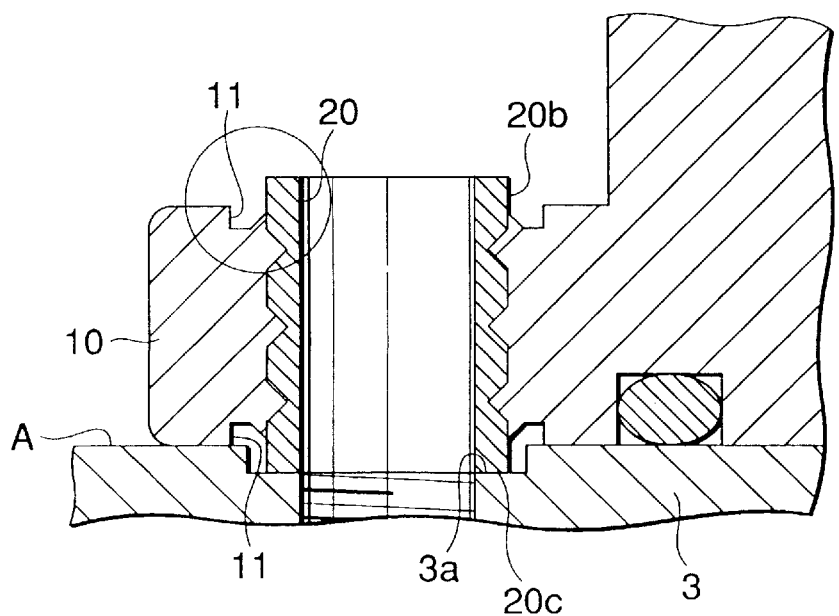
FIG. 4 is a sectional view showing another example of the resin molding bracket, which constitutes a second embodiment of the invention.
Figure 5:
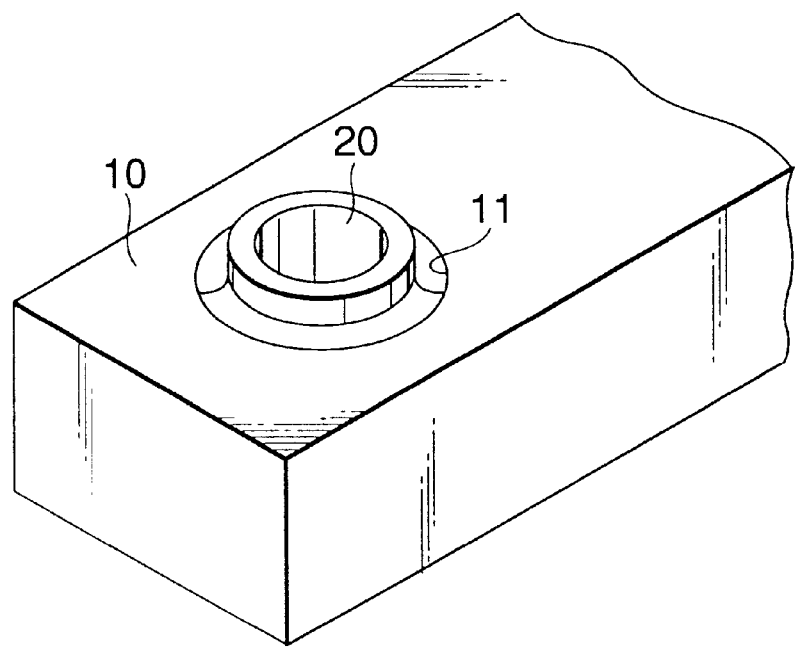
FIG. 5 is a perspective view showing the bracket, the second embodiment of the invention.

Another example of the resin molding bracket, which constitutes a second embodiment of the invention, will be described with reference to FIGS. 3 through 5.

FIG. 3 is a sectional view showing the bracket, the above-described embodiment of the invention. FIG. 4 is also a sectional view showing the bracket, the second embodiment, of the invention. FIG. 5 is a perspective view of the bracket shown in FIG. 4.

In the case where the bracket 1, the first embodiment, is formed by insert-molding, as shown in FIG. 3 the bracket body 10 is contracted when cooled after the molding work. The contraction may cause the resins around the protrusions 20b and 20c of the collar 20 to rise (swell) (cf. the part of FIG. 3 which is surrounded by a circle).

This rise obstructs the close contact of the bracket body 10 with the aimed member 3, and lowers the water-proof characteristic with the joint surface A of the bracket body 10 and the aimed member 3 as a seal surface.

In order to overcome the above-described difficulties, in the bracket 1, the second embodiment, annular grooves 11 and 11 are formed in the bracket body 10 in such a manner that they surround the protrusions 20b and 20c, respectively.

As was described above, the configuration of the grooves 11 and 11 is annular surrounding the protrusions 20b and 20c, and, in order to positively hold the collar 20, the inner walls of each of the grooves which are in contact with the protrusions 20b and 20c are raised.

The above-described structure in which the grooves are modified, reduces the rise of resin around the protrusions 20b and 20c, and improves the water-proof characteristic in the case where the joint surface A of the bracket body 10 and the aimed member 3 is a seal surface.

In order to minimize the rise of resin which cannot be reduced by the formation of the annular grooves 11 and 11, in the bracket 1, the second embodiment, the diameter of the step (recess) 3a of the aimed member 3 is made larger than the diameter of the protrusions 20c of the collar 20.

Hence, the rise of resin which cannot be reduced by the annular grooves 11 and 11 is received in the step 3a, whereby the joint surface A is positively made high in water proof characteristic.

While a few embodiments of the invention have been described, the invention is not limited thereto or thereby.

For instance, although in the above-described embodiments, the collar 20 has the rectangular-pyramid-shaped recesses 20a, the invention is not limited thereto or thereby. That is, they may be replaced with polygonal pyramid-shaped recesses, conical recesses, or polygonal-prism-shaped recesses, or cylindrical recesses.

Moreover, polygonal-prism-shaped protrusions may be formed on the outer cylindrical surface of the collar 20, to fixedly position the collar 20 in the bracket body 10.

Figure 6:
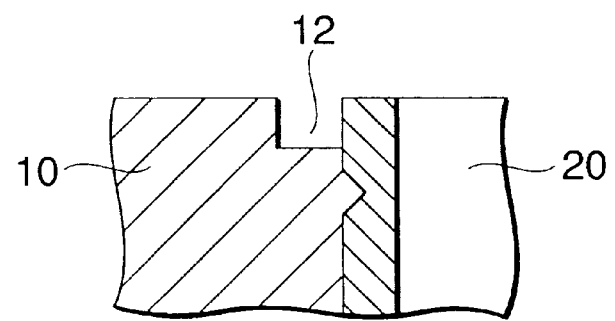
FIG. 6 is an enlarged sectional view showing a part of a modification of the bracket according to the second embodiment of the invention.
Figure 9:
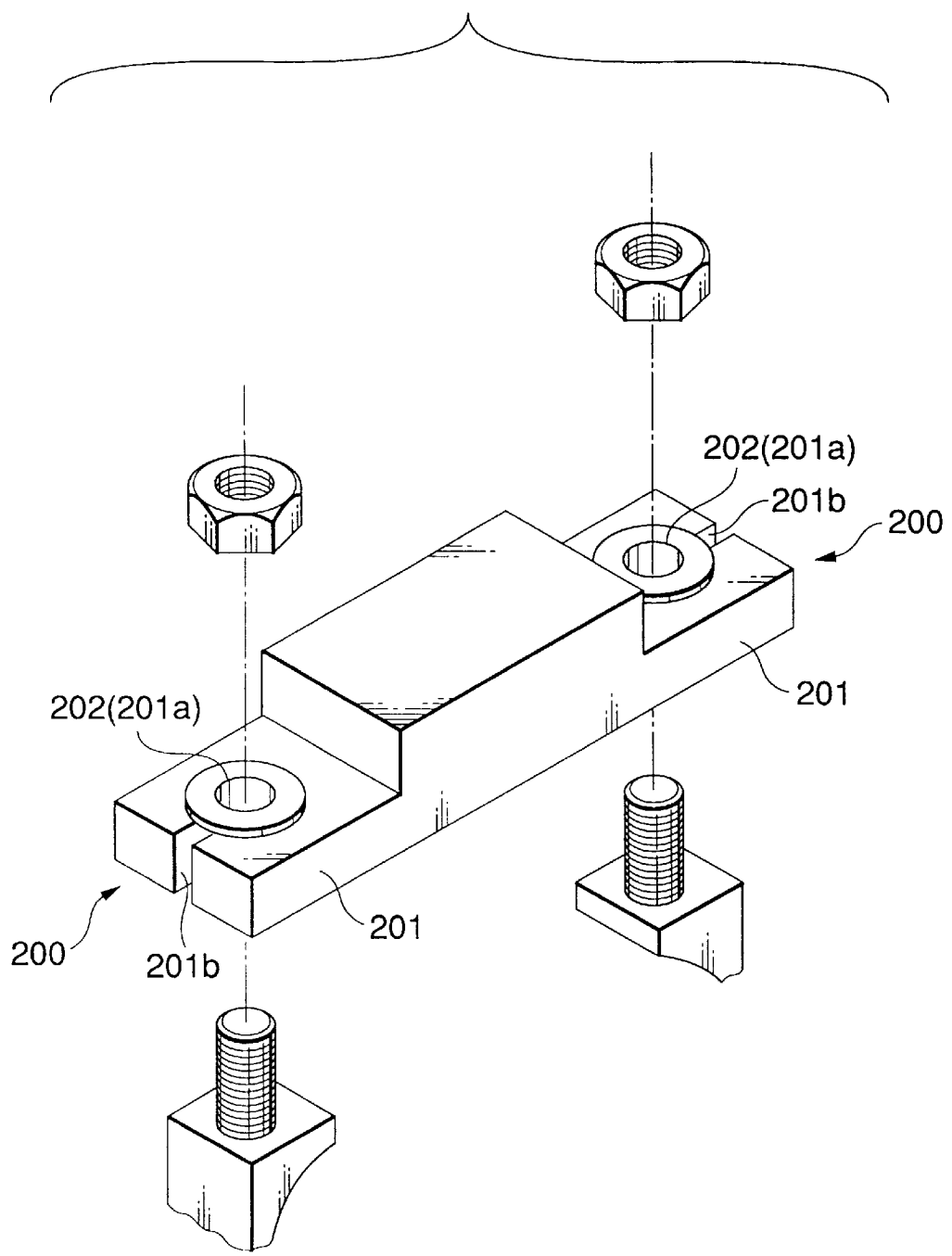
FIG. 9 is a perspective view showing a conventional bracket.
Figure 10:
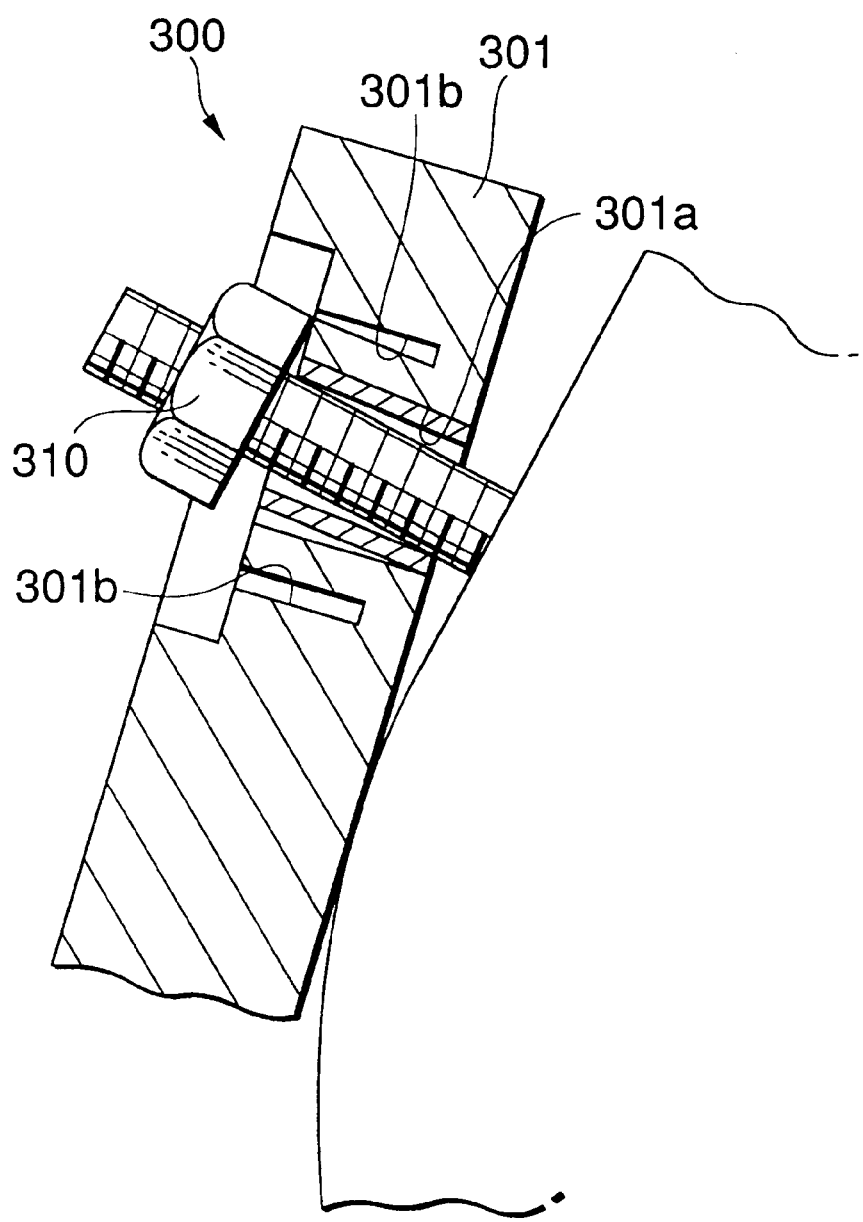
FIG. 10 is a perspective view showing a conventional bracket.

In the second embodiment, the portions of the annular grooves are raised which are in contact with the protrusions 20b and 20c; however, the second embodiment may be modified as follows: As shown in FIG. 6, annular grooves 12 and 12 may be employed which, as shown in FIG. 6, are not swelled and rectangular in section.

As was described above, although being simple in structure, the resin molding bracket of the invention is positively prevented from being broken even if it is tightened excessively hard, and is high in water-proof characteristic.

What is claimed is:

1. A resin molding bracket comprising:
    a plate-shaped bracket body integrally formed with a resin molding;
    a collar positioned in an opening through said bracket body for receiving a bolt to fixedly secure said bracket body; and
    an outer peripheral surface of said collar having means for fixedly positioning said collar in said bracket body, and said collar having opposite end protrusions protruded respectively from opposite surfaces of said bracket body.

2. A resin molding bracket as claimed in claim 1, wherein said bracket body includes annular grooves which surround outer cylindrical surfaces of said end protrusions of said collar.

3. A resin molding bracket as claimed in claim 1, wherein the wall thickness of said bracket body is not less than the diameter of said collar.

4. A resin molding bracket as claimed in claim 1, wherein said collar is made integral with said bracket body by insert-molding.

5. A resin molding bracket as claimed in claim 1, wherein said means for fixedly positioning said collar comprises at least one of recesses and protrusions.

* * * * *